US012784257B2

(12) United States Patent
Song et al.

(10) Patent No.: US 12,784,257 B2
(45) Date of Patent: Nov. 3, 2026

(54) METHOD FOR IDENTIFYING ROBOT POURING REGIONS BASED ON HIERARCHICAL PROCESSING AND CONNECTIVITY MAXIMIZATION AND SYSTEM THEREOF

(71) Applicant: SHANDONG UNIVERSITY, Jinan (CN)

(72) Inventors: Rui Song, Jinan (CN); Xincheng Tian, Jinan (CN); Xuewen Rong, Jinan (CN); Xin Ma, Jinan (CN); Lelai Zhou, Jinan (CN); Chaoqun Wang, Jinan (CN); Yixiang Liu, Jinan (CN); Huanghe Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 219 days.

(21) Appl. No.: 18/746,492

(22) Filed: Jun. 18, 2024

(65) Prior Publication Data

US 2025/0022158 A1 Jan. 16, 2025

(30) Foreign Application Priority Data

Jul. 12, 2023 (CN) ......................... 202310854808.5

(51) Int. Cl.
*G06T 7/70* (2017.01)
*G05D 1/646* (2024.01)
(Continued)

(52) U.S. Cl.
CPC ............... *G06T 7/70* (2017.01); *G05D 1/646* (2024.01); *G06T 5/70* (2024.01); *G06T 7/50* (2017.01);
(Continued)

(58) Field of Classification Search
CPC .... G06T 7/70; G06T 5/70; G06T 7/50; G05D 1/646; G05D 2101/15; G05D 2111/10;
(Continued)

(56) References Cited

U.S. PATENT DOCUMENTS

2023/0311330 A1* 10/2023 Burns .................... B25J 9/1697 700/231
2024/0141624 A1* 5/2024 Torttila ................... E02F 9/262
2025/0289117 A1* 9/2025 Liu ....................... B25J 9/0087

FOREIGN PATENT DOCUMENTS

CN 113031437 A * 6/2021 ........... G05B 13/042

OTHER PUBLICATIONS

Y. Sueki and Y. Noda, "Optimal positioning of ladle in automatic pouring machine in consideration of pouring liquid accurately into sprue," 2017 IEEE International Conference on Advanced Intelligent Mechatronics (AIM), Munich, Germany, 2017, pp. 897-903, doi : 10.1109/AIM.2017.8014132. (Year: 2017).*
(Continued)

*Primary Examiner* — Wade Miles
*Assistant Examiner* — Sidney Leigh Molnar
(74) *Attorney, Agent, or Firm* — Oliff PLC

(57) ABSTRACT

An optimized method for identifying robot pouring regions based on hierarchical processing and connectivity maximization and a system thereof, wherein the optimized method includes: rough identification stage: identifying and positioning, according to working characteristics of mobile robot, target container through vision module when a distance from target region is relatively far, and generating information collection position of target container required for fine identification according to the positioning; fine identification stage: obtaining, by mobile robot, information of target container and source container, and generating corresponding connectable domains, then identifying and optimizing robot pouring region by using connectivity maxi-
(Continued)

mization method. It solves problems of autonomous identification of pouring region of the mobile robot, can be applied to most target containers and source containers, and enhances the generalization ability of robot pouring manipulation skills.

6 Claims, 3 Drawing Sheets

(51) Int. Cl.
*G05D 101/15* (2024.01)
*G05D 111/10* (2024.01)
*G06T 5/70* (2024.01)
*G06T 7/50* (2017.01)

(52) U.S. Cl.
CPC ...... *G05D 2101/15* (2024.01); *G05D 2111/10* (2024.01)

(58) Field of Classification Search
CPC .. G05D 2105/30; G05D 1/665; G05D 1/6895; G05D 1/243; G05D 2109/10; B25J 9/1664; B25J 9/1602; B25J 9/161
USPC .................................................. 700/245–264
See application file for complete search history.

(56) References Cited

OTHER PUBLICATIONS

OpenCV, "Contour Features", version 4.14.0-dev, Accessed Mar. 18, 2026, https://docs.opencv.org/4.x/dd/d49/tutorial_py_contour_features.html.*
Jiang, Yuning, Jingjing Meng, and Junsong Yuan. "Grid-based local feature bundling for efficient object search and localization." 2011 18th IEEE International Conference on Image Processing. IEEE, 2011. (Year: 2011).*
Chief Architect, "Increasing Field of View for a 3D Camera View", Home Designer Software, Last Modified Jul. 23, 2021, https://www.homedesignersoftware.com/support/article/KB-00314/increasing-the-field-of-view-for-a-3d-camera-view.html#:~:text=ANSWER,angle%20the%20camera%20is%20tilted. (Year: 2021).*
S. T. Blue and M. Brindha, "Edge detection based boundary box construction algorithm for improving the precision of object detection in YOLOv3," 2019 10th International Conference on Computing, Communication and Networking Technologies (ICCCNT), Kanpur, India, 2019, pp. 1-5. (Year: 2019).*
Neubert, S., Junginger, S., Roddelkopf, T., Burgdorf, S.-J., Stoll, N. and Thurow, K. (2022), Automated System for Pouring and Filtration Tasks in Laboratory Applications. Chemie Ingenieur Technik, 94: 530-541. https://doi.org/10.1002/cite.202000225 (Year: 2022).*
N. Saito, N. B. Dai, T. Ogata, H. Mori and S. Sugano, "Real-time Liquid Pouring Motion Generation: End-to-End Sensorimotor Coordination for Unknown Liquid Dynamics Trained with Deep Neural Networks," 2019 IEEE International Conference on Robotics and Biomimetics (ROBIO), Dali, China, 2019. (Year: 2019).*
Wu, W.-S.; Lu, Z.-M. A Real-Time Cup-Detection Method Based on YOLOv3 for Inventory Management. Sensors 2022, 22, 6956. https://doi.org/10.3390/s22186956 (Year: 2022).*
Do, Chau, and Wolfram Burgard. "Accurate pouring with an autonomous robot using an rgb-d camera." International Conference on Intelligent Autonomous Systems. Cham: Springer International Publishing, 2018. (Year: 2018).*
C. Dong, M. Takizawa, S. Kudoh and T. Suehiro, "Precision Pouring into Unknown Containers by Service Robots," 2019 IEEE/RSJ International Conference on Intelligent Robots and Systems (IROS), Macau, China, 2019, pp. 5875-5882, doi: 10.1109/IROS40897.2019.8967911. (Year: 2019).*
Pan, Zherong, Chonhyon Park, and Dinesh Manocha. "Robot motion planning for pouring liquids." Proceedings of the international conference on automated planning and scheduling. vol. 26. 2016. (Year: 2016).*
Guevara, Tatiana López, et al. "Adaptable pouring: Teaching robots not to spill using fast but approximate fluid simulation." 1st Conference on Robot Learning 2017. 2017. (Year: 2017).*
M. Kennedy, K. Schmeckpeper, D. Thakur, C. Jiang, V. Kumar and K. Daniilidis, "Autonomous Precision Pouring From Unknown Containers," in IEEE Robotics and Automation Letters, vol. 4, No. 3, pp. 2317-2324, Jul. 2019. (Year: 2019).*
You et al., Translated copy of CN113031437, Patent Translate, Filed Feb. 26, 2021, Published Jun. 25, 2021, Accessed Mar. 18, 2026. (Year: 2021).*
Santos, Matheus C., et al. "MB-RRT: An inverse kinematics solver of reduced dimension." IEEE Access 9 (2021): 148558-148573. (Year: 2021).*

* cited by examiner

METHOD FOR IDENTIFYING ROBOT POURING REGIONS BASED ON HIERARCHICAL PROCESSING AND CONNECTIVITY MAXIMIZATION AND SYSTEM THEREOF

TECHNICAL FIELD

The present invention belongs to the technical field of identification of robot pouring, and it particularly relates to an optimized method for identifying robot pouring regions based on hierarchical processing and connectivity maximization and a system thereof.

BACKGROUND

The statements in this section merely provide background information related to the present invention and are not necessarily prior art.

The pouring skill of robots is a very widely used manipulation skill, whether it is home service or laboratory manipulation, there are many direct application scenarios. Because of the diversity of manipulating objects (e.g. liquid, particle, or powder) of the pouring manipulation, complex dynamic processes have been incorporated into the manipulating tasks of the pouring manipulation, which brings great challenge to robot manipulation skill learning. How to learn accurate and widely applicable pouring manipulation skills has become an important topic in the field of robot manipulation skills learning.

The existing research on robot pouring manipulation skill learning mainly focuses on the control and learning of the pouring action of fixed-type mechanical arms, which is often given a fixed pouring region for the robot, but it is difficult to realize the autonomous selection and optimization of the pouring region for the robot, which makes it difficult for the robot to complete the whole process of pouring task autonomously.

SUMMARY

In order to solve at least one technical problem mentioned in the background above, the present invention provides an optimized method for identifying robot pouring regions based on hierarchical processing and connectivity maximization and a system thereof, which can realize the identification and the optimization of the identification of the pouring region of a mobile robot, can be widely adapted to different pouring scenarios, and can be easily extended to the process of learning the pouring manipulation skill of a fixed-type mechanical arm, thereby providing support for the learning and realization of accurate and applicable extensive pouring manipulation skills of the robot.

In order to achieve the above object, the present invention adopts the following technical solutions.

A first aspect of the present invention provides an optimized method for identifying robot pouring regions based on hierarchical processing and connectivity maximization, comprising the following steps:

performing a preliminary location of a target container based on environmental information image to obtain a spatial region of the target container;

generating a trajectory plan and a path plan of a mobile chassis of a mobile robot according to the spatial region of the target container; and, performing a fine identification by controlling a mechanical arm of the mobile robot to move to an information collection position according to the trajectory plan and the path plan, to obtain a pouring region; wherein, a process of the fine identification specifically comprises:

acquiring image information of the target container and a source container;

generating corresponding connectable domain based on the image information of the target container and the source container; and searching, by using a method of connectivity maximization, a pouring point of the source container which makes an intersection of the connectable domains of the source container and the target container maximum in a searching plane, and a pouring direction, further obtaining positions of pouring points on the source container, and then obtaining the pouring region according to a combination of the positions of the pouring points.

A second aspect of the present invention provides an optimized system for identifying robot pouring regions based on hierarchical processing and connectivity maximization, comprising:

a rough-identification module, being configured to perform a preliminary location of a target container based on an environmental information image to obtain a spatial region of the target container; and being configured to generate a trajectory plan and a path plan of a mobile chassis of a mobile robot according to the spatial region of the target container; and a fine-identification module, being configured to perform a fine identification by controlling a mechanical arm of the mobile robot to move to an information collection position according to the trajectory plan and the path plan, to obtain a pouring region; wherein, a process of the fine identification specifically comprises:

acquiring image information of the target container and a source container;

generating corresponding connectable domain based on the image information of the target container and the source container; and searching, by using a method of connectivity maximization, a pouring point of the source container which makes an intersection of the connectable domains of the source container and the target container maximum in a searching plane, and a pouring direction, further obtaining positions of pouring points on the source container, and then obtaining the pouring region according to a combination of the positions of the pouring points.

A third aspect of the invention provides a non-transitory computer-readable storage medium.

The non-transitory computer-readable storage medium having a computer program stored thereon, when the computer program is executed by a processor, implementing steps of the optimized method for identifying robot pouring regions based on hierarchical processing and connectivity maximization according to the first aspect.

A fourth aspect of the invention provides computer equipment.

The computer equipment, comprising a memory, a processor, and a computer program stored on the memory and executable on the processor, when the processor executing the program, implementing steps of the optimized method for identifying robot pouring regions based on hierarchical processing and connectivity maximization according to the first aspect.

Compared with the prior art, the present invention has the advantages that:

1. According to the present invention, proposing the method to determine the optimal pouring region of the robot by using the connectivity maximization, and proposing a corresponding simplified calculation for the method, to solve the problem of the autonomous identification of the pouring region of the mobile robot.
2. According to the present invention, the proposed method has strong generalization function, can be applied to most target containers and source containers, and enhances the generalization ability of the robot pouring manipulation skill.
3. According to the present invention, proposing a framework of the pouring region identification based on hierarchical processing and connectivity maximization for mobile robot pouring region identification, which can be applied to mobile robot pouring regions or migrated to fixed-type mechanical arms, having a wide range of applications.

Additional aspects of the present invention will be set forth in part in the description which follows, and in part will be obvious from the description, or may be learned by practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, the terms “comprise” and/or “include” used in this specification indicate that there are features, steps, operations, devices, components, and/or combinations thereof.

In order to enable a mobile robot to master an optimized skill of autonomous identification of a pouring region and realize autonomous completion of a complete pouring task flow, the present invention provides an optimized method for identifying robot pouring regions based on hierarchical processing and connectivity maximization, to realize the autonomous identification of the pouring region by the mobile robot and optimization of the identification.

Figure 1:
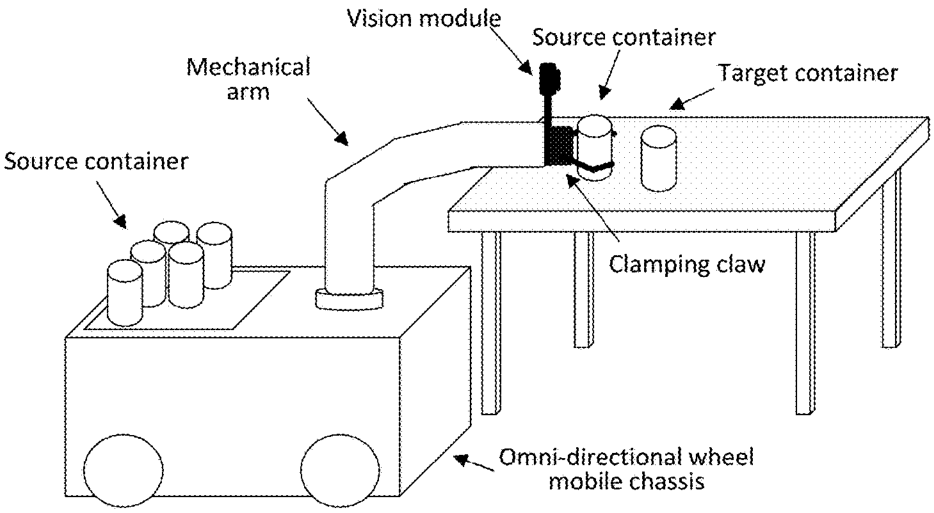
FIG. 1 shows a system of a mobile work robot system provide by embodiments of the present invention and a pouring scenario.

According to the proposed method of the present invention, a system for a mobile robot and a pouring task scenario as shown in FIG. 1 are built.

The system comprises a mobile-chassis module (this module comprises an omni-directional wheel motion-control subsystem, a radar-positioning subsystem and other subsystems, and is used for realizing a motion control and an obstacle avoidance function of the mobile robot), a mechanical-arm module (this module comprises a mechanical-arm sub-module and a clamping-claw module used for holding a container, and is used for realizing clamping of a source container and realization of camera actions and pouring actions), a vision module (this module comprises an RGB-D camera, a camera bracket and the like, and is used for identifying a source container, a target container and a working environment); further, the pouring task scenario comprises a source container (a container used for pouring substances, an initial state of the container is that the container contains substances to be poured, and an opening of the container is an axisymmetric figure), a target container (a container used for receiving the substances) and a matched working environment.

The goal of the robot pour manipulation skill is to be able to accurately pour substances from source containers into target containers with broad adaptability. The accurate pouring requires that the robot minimize a spillage of the substances throughout the pouring manipulation, while the broad adaptability requires that the robot be able to adapt to a variety of source containers, target containers, and pouring scenarios.

In order to realize the mobile robot to accurately complete the pouring manipulation with broad adaptability, the present invention proposes the optimized method for identifying robot pouring regions based on hierarchical processing and connectivity maximization, of which a core point is to adopt a hierarchical processing for the optimization of the identification process of the pouring region according to the working characteristics of mobile robot, and further proposes the model of the connectable domain of the source container that can predict the fluid flow region in the source container, and ultimately achieve autonomous intelligent identification of the optimal pouring region by maximizing the connectivity.

Embodiment 1

Figure 2:
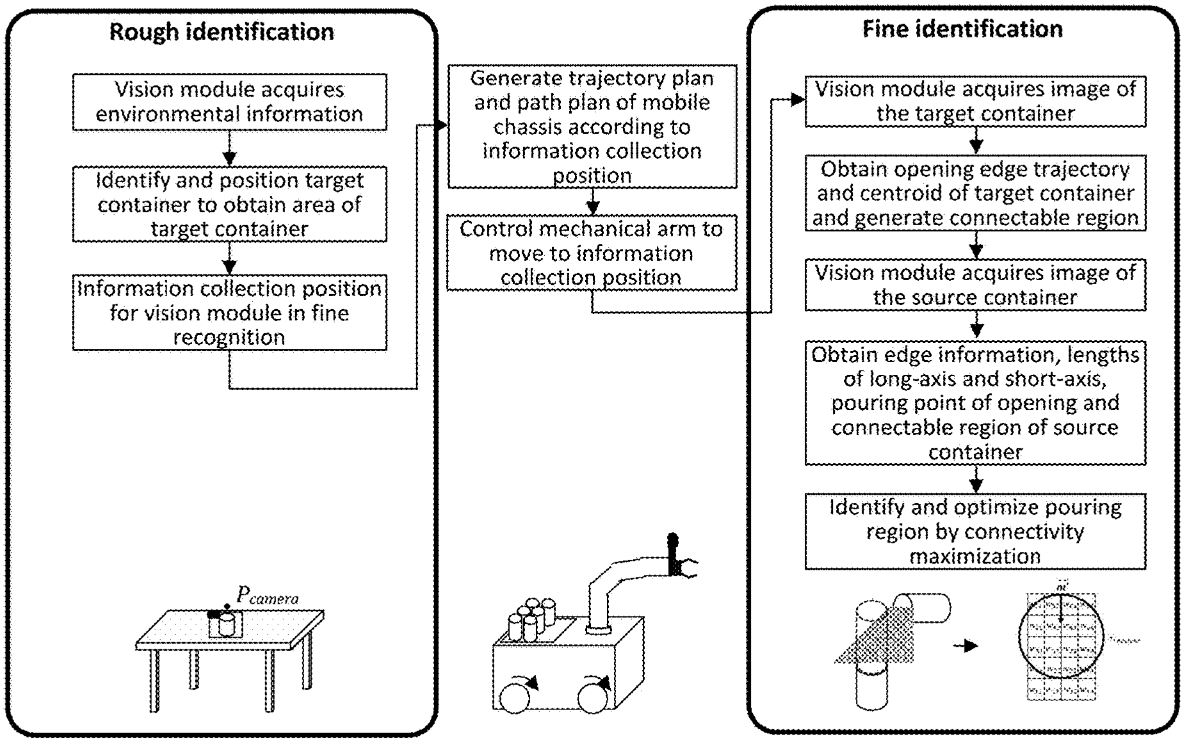
FIG. 2 is a flowchart of an optimized method for identifying robot pouring regions based on hierarchical processing and connectivity maximization provided by embodiments of the present invention.

As shown in FIG. 2, the present embodiment provides an optimized method for identifying robot pouring regions based on hierarchical processing and connectivity maximization, comprising the following steps:

First Stage: Rough Identification

The present stage of the rough identification is to perform, according to working characteristics of a mobile robot, an identification and a positioning of a target container through a vision module when a distance from a target region is relatively far, and generate information collection position of the target container required for a fine identification according to the positioning, comprising the following steps:

Step 1: acquiring environmental information (image $I_{work}$) by using the vision module;

Step 2: extracting information of the image $I_{work}$ to identify and position the target container to obtain a spatial region of the target container $\Omega_{receiver}$; and Step 3: generating information collection position $P_{camera}$ for the vision module in the fine identification stage according to the spatial region of the target container $\Omega_{receiver}$.

Wherein, the step 2 includes the following steps:

performing the identification of the target container by using a YOLO (You Only Look Once) algorithm trained by container-class dataset, to obtain a region of the target container in the image and marking an identification frame; and performing gray processing and binary processing on the image according to the identified position of the target container in the image, to obtain centroid coordinates $(x_c, y_c)$ of the region of the target container, and further obtaining center coordinates $(x_u, y_u)$ of an upper edge of the target container, and then calculating world coordinates $(x_w, y_w, z_w)$ of the target container according to a target distance obtained by a depth camera.

Wherein, the step 3 includes the following steps:

obtaining the information collection position $P_{camera}=((x_w, y_w, z_w+h_{camera}))$ for the vision module in the fine identification stage by increasing $h_{camera}$ on the z-axis of the world coordinates of the target container; wherein, the value of $h_{camera}$ is different according to the camera model and resolution, and setting a distance for obtaining the best photographing effect.

Wherein, $h_{camera}$ refers to the distance that the camera needs to keep from the object to be photographed when taking pictures to obtain information, and this distance needs to integrate a reachable range of the mechanical arm and the camera shooting parameters. For example, a distance test range of a RealSense camera is 0.1-10 m, so it is best for the camera to keep the distance from the object to be photographed at a distance of more than 0.1 m, cannot be tightly attached.

After obtaining the information collection position $P_{camera}$ in the rough identification stage, planning a motion trajectory of the mobile chassis by using the RRT (rapidly-exploring random tree) algorithm, and controlling the mobile chassis to move to a vicinity of a target position according to the motion trajectory, and then generating, by using the inverse kinematics method, joint parameters of the mechanical arm according to the information collection position $P_{camera}$ generated in the rough identification stage, and moving the vision module of the mechanical arm to the information collection position.

Second Stage: Fine Identification

In the present stage of the fine identification, firstly obtaining, by the mobile robot, the information of the target container and the source container and generating corresponding connectable domain, and then identify and optimize the robot pouring region by using the method of connectivity maximization.

Wherein, a specific process is as follows:

Step 1: obtaining image information (image $I_{receiver}$) of the target container through the vision module;

Step 2: extracting information of the image $I_{receiver}$, obtaining an edge trajectory $\tau_{receiver}$ and a centroid $O_{receiver}$ of an opening of the target container, and generating a connectable domain $\Omega_{receiver}$ of the source container according to a connectable domain model;

Step 3: obtaining image information (image $I_{container}$) of the source container through the vision module;

Step 4: extracting information of the image $I_{container}$, obtaining edge information $\tau_{container}$ of an opening of the source container, a long-axis length $l_l$, and a short-axis length $l_s$ of the opening, and a pouring point m of the opening, and then generating a connectable domain $\Omega_{container}$ of the source container according to the connectable domain model; and Step 5: identifying and optimizing the robot pouring region by using the method of connectivity maximization, and obtaining the pouring region according to a combination of positions of pouring point $\Omega_{pour}$.

Figure 4:
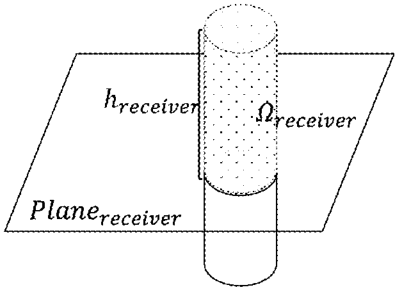
FIG. 4 is a schematic diagram of a model of connectible components of a source container provided by embodiments of the present invention.

Wherein, the step 2 includes the following steps:

(1) performing noise reduction processing, gray processing, and binary processing on the image $I_{receiver}$ respectively, and obtaining the edge trajectory $\tau_{receiver}$ and the centroid $O_{receiver}$ of the opening of the target container by using a contour detection method and a characteristic moment in OpenCV; and (2) according to the edge trajectory $\tau_{receiver}$ of the opening of the target container, generating the region $\Omega_{receiver}$ as the connectable domain of the target container by making the area surrounded by the trajectory as a bottom and the parameter $h_{receiver}$ as the high, as shown in FIG. 4.

Wherein, $h_{receiver}$ can be defined as infinity or according to the following formula:

$$h_{receiver} = l_l/2 + h_{container};$$

wherein, $h_{container}$ is a parameter of the model of the connectable domain of the source container; $h_{receiver}$ is upward projection length of a plane of the opening of the target container.

Wherein, the step 4 includes the following steps:

(1) performing noise reduction processing gray processing and binary processing on the image $I_{container}$ respectively, and obtaining the edge trajectory $\tau_{container}$ and the centroid $O_{container}$ of the opening of the source container by using the contour detection method and the characteristic moment method in the OpenCV, and then calculating the long-axis length $l_l$ and the short-axis length $l_s$ of the contour of the opening according to a circumscribed rectangle of the contour; calculating a vertical intersection of the centroid on the short axis of the circumscribed rectangle of the contour as a pouring point m of the source container.

(2) in this step, the connectable domain of the source container is generated, wherein: simplifying a region where the liquid flows out of the source container into a triangular prism having a base area of a right triangle with an angle of α and a height of $l_l/2+h_{hcontainer}$, and a height $l_s$ according to the calculated long-axis distance $l_l$ and short-axis distance $l_s$ of the contour of the opening, wherein the angle $\alpha$ can be set to different values according to the state of the fluid and the pouring angular velocity of the source container, the higher the viscosity of the liquid, the smaller the $\alpha$ value, the larger the pouring angular velocity of the source container, and the larger the $\alpha$ value, when the fluid property is unknown, $\alpha$ can be tentatively set to 45°. $h_{container}$ is the distance from the pouring point m of the source container to a surface of the opening of the target container, which is an adjustable parameter greater than or equal to 0, wherein $h_{container}$ can be set as 1 cm, that is, the pouring point of the source container is 1 cm away from the upper surface of the target container. In addition, a projection of the pouring point m on the surface of the opening of the target container is set as m', and a unit vector $\overrightarrow{m'}$ is formed by extending the opening direction of the container from the starting point m'. The connectable domain of the source container $\Omega_{container}$ constructed as described above is shown in FIG. 3.

The formula for the connectable domain of the source container is as follows:

$$\Omega_{container} = l_s \times (l_l/2 + h_{container})^2 \tan\alpha$$

Figure 3:
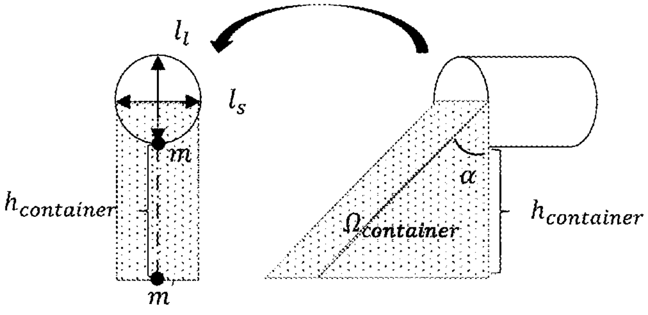
FIG. 3 is a schematic diagram of a model of connectible components of a target container provided by embodiments of the present invention.

Advantages and rationality of using this method to set up the connectable domain are as follows:

When the fluid flows out from an opening, it is a complex calculation process to predict the trajectory and target region of the fluid using accurate fluid mechanics principles, and the generalization ability of the results of fluid mechanics calculation is poor due to the different properties of different fluids. However, the simplified model of the triangular prism with parameterized ($\alpha$, $l_l$, $l_s$, h) can well cover the flow region of the fluid, and has a wide range of applicability, which can facilitate the identification and optimization of the pouring region. In addition, FIG. 3 shows the case where the angle of the source container is 90° and the opening of the source container is circular. During actual pouring, the change in pouring angle can be accommodated by adjusting the model parameter $\alpha$. The shape and size of the opening of the source container can also be generalized in the axisymmetric graph range, and the model can be widely adopted.

Wherein, the step 5 includes the following steps:

calculate a maximum value of the intersection region of the target container and the source container, expressed as follows:

$$\max_{m} \Omega_{container(m)} \cap \Omega_{receiver} \text{ s.t. } \overrightarrow{m'} \in \text{Plane}_{receiver}$$

The purpose of calculating the maximum value is to search for the position and direction of the maximum intersection $\overrightarrow{m'}$ of the connectable domain of the source container and the target container in the $\text{Plane}_{receiver}$, and further obtain the position of the pouring point m on the source container.

Figure 5:
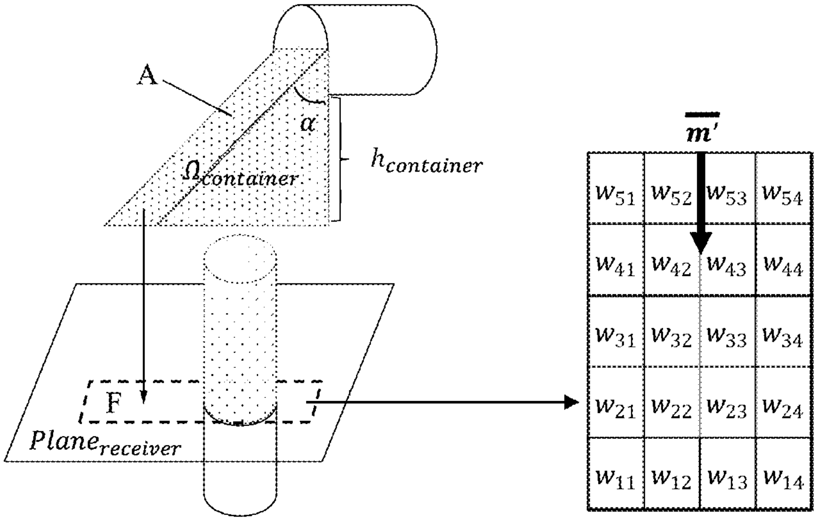
FIG. 5 is a schematic diagram of a projection plane of a face A of a triangular prism, rectangular division, and weight distribution of the connectible components of the source container provided by embodiments of the present invention.

Further optimization can be achieved by simplifying by using the following computational methods, specifically:

(1) projecting the connectable region $\Omega_{container}$ of the source container onto the $\text{Plane}_{receiver}$, and let the projected region be F, and a shape thereof be a rectangular;

(2) dividing the projection region F of the connectable domain of the source container into a×b rectangles equally, as shown in FIG. 5, and calculating the weight values $w_{ij}$ of the rectangles according to the parameters of the connectable domain $l_l/2+h_{container}$;

the calculation formula of the weight is as follows:

$$w_{ij} = i \times (l_l/2 + h_{container})/a;$$

Figure 6:
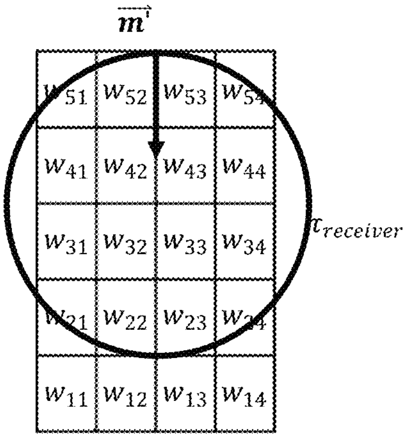
FIG. 6 is a schematic diagram of the projection plane of the connectible components of the source container including an opening trajectory provided by embodiments of the present invention.

(3) searching for the sum of the weights of the projection plane of the connectable domain of the source container contained in the opening trajectory $\tau_{receiver}$ of the target container in the $\text{Plane}_{receiver}$ (in practice, if the region contained in the weight rectangle exceeds ½, it is considered to be all contained), and the pouring point m corresponding to $\overrightarrow{m'}$ corresponding to the maximum weight value is the pouring point and the pouring direction of the source container, as shown in FIG. 6.

Figure 7:
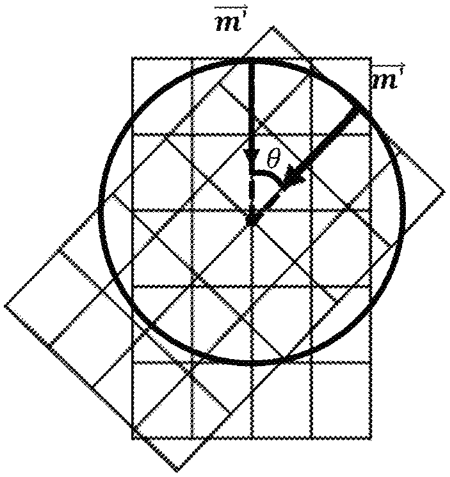
FIG. 7 is an execution schematic diagram of a simplified search process provided by embodiments of the present invention.

(4) the search process can be further simplified according to the existing pouring knowledge, wherein taking the centroid $O_{receiver}$ of the opening of the target container as the starting point, making a ray outward at an interval angle $\theta$ to intersect with the trajectory $\tau_{receiver}$ of the opening of the target container, and taking the intersection as the starting point, performing a searching by making the direction of $\overrightarrow{m'}$ along the ray to the centroid, as shown in FIG. 7; and (5) finally, the region composed of the pouring point m of the maximum sum of the weights contained in the trajectory $\tau_{receiver}$ of the opening of the target container is the pouring region $\Omega_{pour}$ identified and optimized by the method.

Embodiment 2

The present embodiment provides an optimized system for identifying robot pouring regions based on hierarchical processing and connectivity maximization, comprising:

a rough-identification module, being configured to perform a preliminary location of a target container based on environmental information image to obtain a spatial region of the target container; and being configured to generate a trajectory plan and a path plan of a mobile chassis of a mobile robot according to the spatial region of the target container; and a fine-identification module, being configured to perform a fine identification by controlling a mechanical arm of the mobile robot to move to an information collection position according to the trajectory plan and the path plan, to obtain a pouring region; wherein, a process of the fine identification specifically comprises:

acquiring image information of the target container and a source container;

generating corresponding connectable domain based on the image information of the target container and the source container; and searching, by using a method of connectivity maximization, a pouring point of the source container which makes an intersection of the connectable domains of the source container and the target container maximum in a searching plane, and a pouring direction, further obtaining positions of pouring points on the source container, and then obtaining the pouring region according to a combination of the positions of the pouring points.

Embodiment 3

The present embodiment provides a non-transitory computer-readable storage medium having a computer program stored thereon, when the computer program is executed by a processor, implementing steps of the optimized method for identifying robot pouring regions based on hierarchical processing and connectivity maximization as described in Embodiment 1.

Embodiment 4

The present embodiment provides computer equipment, comprising a memory, a processor, and a computer program stored on the memory and executable on the processor, when the processor executing the program, implementing steps of the optimized method for identifying robot pouring regions based on hierarchical processing and connectivity maximization as described in Embodiment 1.

Those skilled in the art should understand that the examples of the present invention can be provided as methods, systems, or computer program products. Therefore, the present invention may take the form of hardware examples, software examples, or examples combining software and hardware aspects. Furthermore, the present invention may take the form of a computer program product implemented on one or more computer usable storage media (including but not limited to disk memory, optical memory, etc.) containing computer usable program codes.

The present invention is described with reference to flowcharts and/or block diagrams of methods, devices (systems), and computer program products according to the examples of the present invention. It should be understood that each of the processes and/or boxes in the flowchart and/or block diagram, and the combination of the processes and/or boxes in the flowchart and/or block diagram, may be implemented by computer program instructions. These computer program instructions may be provided to a processor of a general purpose computer, a specialized computer, an embedded processor, or other programmable data processing device to produce a machine such that the instructions executed by the processor of the computer or other programmable data processing device produce a device for implementing the functions specified in one process or multiple processes of the flowchart and/or one box or multiple boxes of the block diagram.

These computer program instructions may also be stored in a computer-readable memory capable of directing the computer or other programmable data processing apparatus to operate in a particular manner such that the instructions stored in such the computer-readable memory produce an article of manufacture comprising an instruction device that implements the function specified in one process or a plurality of processes of the flowchart and/or one box or a plurality of boxes of the block diagram.

These computer program instructions may also be loaded onto a computer or other programmable data processing device to enable a series of operational steps to be performed on the computer or other programmable device to generate a computer implemented process, so that instructions executed on a computer or other programmable device provide steps for implementing functions specified in one process or a plurality of processes of the flowchart and/or in one box or a plurality of boxes of the block diagram.

Those skilled in the art can understand that the realization of all or part of the processes in the methods of the above examples can be accomplished by instructing relevant hardware through a computer program. The program can be stored in a computer-readable storage medium. When the program is executed, it may comprise the processes of the examples of the above methods. The storage medium may be a disk, optical disc, Read-only memory (ROM), or random-access memory (RAM).

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A method for identifying robot pouring regions based on hierarchical processing and connectivity maximization, comprising the following steps:

performing an identification of a preliminary location of a target container based on an environmental information image to obtain a spatial region of the target container;

generating a trajectory plan and a path plan of a mobile chassis of a mobile robot according to the spatial region of the target container; and performing a fine identification by controlling a mechanical arm of the mobile robot to move to an information collection position according to the trajectory plan and the path plan to obtain a pouring region; wherein, a process of the fine identification specifically comprises:

acquiring image information of the target container and a source container;

generating a corresponding connectable domain based on the image information of the target container and the source container; and searching, by using a method of connectivity maximization, a pouring point and a pouring direction of the source container which make an intersection of the connectable domain of the source container and a target container maximum in a searching plane, further obtaining positions of the pouring point on the source container, and then obtaining the pouring region according to a combination of the positions of the pouring points;

wherein generating the connectable domain of the source container based on the image information of the source container comprises:

performing noise reduction processing, gray processing, and binary processing on the image of the source container, obtaining an edge trajectory and a centroid of an opening of the source container by using a contour detection method and a characteristic moment method, and calculating a long-axis length and a short-axis length of a contour of the opening according to a circumscribed rectangle of the contour, and then calculating a vertical intersection of the centroid on a short axis of the circumscribed rectangle of the contour as a pouring point of the source container;

simplifying a region where a liquid flows out of the source container into a triangular prism having a base area of a right triangle with an angle of α and a height of $l_l/2+h_{container}$ and a height $l_s$ according to the calculated long-axis distance $l_l$ and short-axis distance $l_s$ wherein, the angle α is set according to states of a fluid and a pouring angular velocity of the source container, $h_{container}$ is the distance from a pouring point m of the source container to a surface of the opening of the target container; and, calculating and generating the connectable domain of the source container $$\Omega_{container} = l_s \times (l_l/2 + h_{container})^2 \tan\alpha.$$

2. The method according to claim 1, wherein performing the identification of the preliminary location of the target container based on the environmental information image to obtain the spatial region of the target container, comprises:

performing the identification of the target container by using a YOLO algorithm, and obtaining an identified region of the target container in the environmental information image and marking an identification frame; and performing gray processing and binary processing on the environmental information image according to a position of the identified region of the target container in the environmental information image, to obtain centroid coordinates of the region of the target container, and further obtaining center coordinates of an upper edge of the target container, and then calculating to obtain world coordinates of the target container combined with a target distance obtained by a depth camera.

3. The method according to claim 1, wherein generating the trajectory plan and the path plan of the mobile chassis of the mobile robot according to the spatial region of the target container, and controlling the mechanical arm of the mobile robot to move to the information collection position according to the trajectory plan and the path plan, comprises:

obtaining the information collection position for a stage of the fine identification by increasing a $h_{camera}$ on the z-axis of the world coordinates of the target container; wherein, the $h_{camera}$ refers to a distance that a camera needs to keep from an object to be photographed when taking pictures to obtain information; and planning a motion trajectory of the mobile chassis by using a rapidly-exploring random tree (RRT) algorithm after obtaining the information collection position, controlling the mobile chassis to move to a vicinity of a target position according to the planned motion trajectory, then generating, by using an inverse kinematics method, joint parameters of the mechanical arm according to the information collection position generated in a stage of rough identification, and moving a vision module on the mechanical arm to the information collection position.

4. The method according to claim 1, wherein generating the connectable domain of the target container based on the image information of the target container, comprises:

performing noise reduction processing, gray processing, and binary processing on the image of the target container, obtaining an edge trajectory and a centroid of an opening of the target container by using a contour detection method and a characteristic moment method; and using an area surrounded by the edge trajectory of the opening of the target container as a bottom and a parameter $h_{receiver}$ as a high to generate a region as the connectable domain of the target container; wherein, the parameter $h_{receiver}$ is an upward projection length of a plane of the opening of the target container.

5. A non-transitory computer-readable storage medium, having a computer program stored thereon, when the computer program is executed by a processor, implementing steps of the method for identifying robot pouring regions based on hierarchical processing and connectivity maximization according to claim 1.

6. Computer equipment, comprising a memory, a processor, and a computer program stored on the memory and executable on the processor, when the processor executing the program, implementing steps of the method for identifying robot pouring regions based on hierarchical processing and connectivity maximization according to claim 1.

* * * * *